(12) United States Patent
M'Membe et al.

(10) Patent No.: US 10,385,869 B2
(45) Date of Patent: Aug. 20, 2019

(54) COMPOSITE COMPONENT

(71) Applicant: ROLLS-ROYCE plc, London (GB)

(72) Inventors: Beene M'Membe, Bristol (GB); Mehdi Yasaee, Bristol (GB); Stephen Hallett, Bristol (GB); Ivana Partridge, Bristol (GB)

(73) Assignee: ROLLS-ROYCE plc, London (GB)

( * ) Notice: Subject to any disclaimer, the term of this patent is extended or adjusted under 35 U.S.C. 154(b) by 281 days.

(21) Appl. No.: 15/448,076

(22) Filed: Mar. 2, 2017

(65) Prior Publication Data
US 2017/0261002 A1 Sep. 14, 2017

(30) Foreign Application Priority Data

Mar. 8, 2016 (GB) .................................. 1603951.3

(51) Int. Cl.
*F01D 5/12* (2006.01)
*F04D 29/52* (2006.01)
(Continued)

(52) U.S. Cl.
CPC ........... *F04D 29/522* (2013.01); *F01D 5/282* (2013.01); *F01D 25/24* (2013.01); *F02C 7/04* (2013.01); *F02K 1/82* (2013.01); *F04D 29/023* (2013.01); *F04D 29/324* (2013.01); *F04D 29/388* (2013.01); *F02K 3/06* (2013.01); *F05D 2220/32* (2013.01); *F05D 2220/36* (2013.01); *F05D 2300/171* (2013.01); *F05D 2300/603* (2013.01); *Y02T 50/672* (2013.01)

(58) Field of Classification Search
CPC ........... B32B 15/14; B32B 15/18; B32B 1/08; B32B 2260/021; B32B 2260/046; B32B 2262/106; B32B 2307/558; B32B 2603/00; B32B 3/06; B32B 7/08; F01D 25/24; F01D 5/147; F01D 5/282; F01D 5/14; F01D 25/005; F04D 29/324; F05B 2280/6003; F05B 2280/6013; F05B 2280/6015; F05D 2300/603; F05D 2300/6034; B29C 2045/0006; B29D 99/0025
USPC .................................................. 277/650–654
See application file for complete search history.

(56) References Cited

U.S. PATENT DOCUMENTS 3,834,832 A * 9/1974 Mallinder ............... B29C 65/56 416/230
5,470,649 A * 11/1995 Farley .................... B29C 70/023 442/238

(Continued)

FOREIGN PATENT DOCUMENTS

EP 2889131 A1 7/2015
FR 2804975 A1 8/2001

(Continued)

OTHER PUBLICATIONS

Aug. 22, 2016 Search Report issued in British Patent Application No. 1603951.3.

*Primary Examiner* — Lindsay M Low
*Assistant Examiner* — Teuta B Holbrook
(74) *Attorney, Agent, or Firm* — Oliff PLC

(57) ABSTRACT

A composite component comprising a plurality of plies. A first set of pins extend in a direction transverse to the plies and a second set of pins extend in a direction transverse to the plies. The pins of the first set are made of a different material to the pins of the second set.

18 Claims, 5 Drawing Sheets

(51) Int. Cl.
*F04D 29/02* (2006.01)
*F04D 29/38* (2006.01)
*F01D 5/28* (2006.01)
*F01D 25/24* (2006.01)
*F02K 1/82* (2006.01)
*F02C 7/04* (2006.01)
*F04D 29/32* (2006.01)
*F02K 3/06* (2006.01)

(56) References Cited

U.S. PATENT DOCUMENTS

| | | | | |
|---|---|---|---|---|
| 5,736,222 A | * | 4/1998 | Childress | B29C 70/24 |
| | | | | 428/119 |
| 5,876,540 A | | 3/1999 | Pannell | |
| 5,958,550 A | * | 9/1999 | Childress | B29C 70/24 |
| | | | | 428/119 |
| 6,291,049 B1 | * | 9/2001 | Kunkel | B32B 3/06 |
| | | | | 428/119 |
| 6,514,593 B1 | | 2/2003 | Jones et al. | |
| 6,613,392 B2 | * | 9/2003 | Baldwin | B29C 70/24 |
| | | | | 427/385.5 |
| 8,852,473 B1 | * | 10/2014 | Tan | B29C 44/3461 |
| | | | | 264/241 |
| 8,893,367 B2 | | 11/2014 | Lander | |
| 9,435,209 B2 | * | 9/2016 | Garcia Crespo | F01D 5/147 |
| 2003/0116678 A1 | * | 6/2003 | Gardner | B64C 1/40 |
| | | | | 244/117 A |
| 2003/0203179 A1 | * | 10/2003 | Hawkins | B32B 3/08 |
| | | | | 428/297.4 |
| 2004/0067139 A1 | * | 4/2004 | Baldwin | B29C 70/24 |
| | | | | 416/229 A |
| 2006/0141257 A1 | * | 6/2006 | Subramanian | C04B 35/565 |
| | | | | 428/408 |
| 2008/0075593 A1 | * | 3/2008 | Read | F01D 5/26 |
| | | | | 416/95 |
| 2008/0187441 A1 | * | 8/2008 | Schreiber | B29C 70/202 |
| | | | | 416/229 R |
| 2011/0070092 A1 | * | 3/2011 | Gerlach | F01D 5/147 |
| | | | | 416/230 |
| 2014/0119928 A1 | * | 5/2014 | Garcia Crespo | F01D 5/147 |
| | | | | 416/219 R |
| 2014/0286765 A1 | * | 9/2014 | Hoyland | F01D 5/282 |
| | | | | 415/200 |
| 2015/0239212 A1 | * | 8/2015 | Frommelt | B32B 9/007 |
| | | | | 428/223 |
| 2016/0103087 A1 | * | 4/2016 | Zhang | F01D 5/282 |
| | | | | 324/71.1 |
| 2016/0159036 A1 | * | 6/2016 | Humfeld | B29C 66/1122 |
| | | | | 428/223 |
| 2016/0160658 A1 | * | 6/2016 | McCaffrey | F01D 5/282 |
| | | | | 415/200 |
| 2017/0029579 A1 | * | 2/2017 | Song | B64C 1/064 |
| 2017/0282466 A1 | * | 10/2017 | Backhouse | B22F 7/064 |

FOREIGN PATENT DOCUMENTS

| | | | | |
|---|---|---|---|---|
| GB | 1500776 A | * | 2/1978 | ........... B29C 70/543 |
| GB | 2040805 A | | 9/1980 | |

* cited by examiner

COMPOSITE COMPONENT

TECHNICAL FIELD

The present disclosure concerns a composite component, a fan blade, a casing and/or a gas turbine engine.

BACKGROUND

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core.

The fan comprises an array of radially extending fan blades mounted on a rotor. The fan blades and/or a casing that surrounds the fan may be manufactured from metallic and/or composite (e.g. non-metallic) materials. In composite fan blades, the blades may include a composite body and a metallic leading edge and a metallic trailing edge.

Composite components are often laminate structures that include a plurality of plies. Each ply generally includes reinforcing fibres (e.g. high strength or high stiffness fibres) embedded in a matrix, e.g. a plastic matrix material. The matrix material of adjacent stacked plies is bonded together to build the composite component. The matrix material is weaker than the fibre material and as such the bond between stacked plies can form a point of weakness. This means that a primary failure mechanism of concern for composite materials is delamination.

Delamination for example of a fan blade may occur in the event of an impact by a foreign object such as a bird strike.

To reduce the risk of delamination of a composite component through thickness reinforcement can be used. One type of through thickness reinforcement is pinning (which may be referred to as z-pinning). A component that has been pinned includes a plurality of pins (or rods) extending through the thickness of the component in a direction transverse to the general direction of the plies.

Pins are generally made of a composite material (e.g. carbon embedded in a resin matrix) and typically have a diameter ranging from or equal to approximately 0.2 mm to 1 mm.

Often, composite pins are manufactured by pultrusion of a carbon fibre tow impregnated by a thermoset resin. The pins of a composite component exert a bridging force on the plies to hold the plies in position relative to each other, this reduces opening of inter-laminar cracks (known as mode I failure) and sliding displacements of inter-laminar cracks (known as mode II failure).

In early research into pinning of components metallic pins were tested, but the industry discounted metallic pins as an option because they perform poorly under mode I loading.

When a fan blade is impacted, e.g. by a bird strike, the fan blade will experience mode I and mode II loading. As such, the pins need to be able to resist delamination in both mode I and mode II.

SUMMARY

In a first aspect there is provided a composite component comprising a plurality of plies. A first set of pins extend in a direction transverse to the plies. A second set of pins extend in a direction transverse to the plies. The pins of the first set are made of a different material to the pins of the second set.

The pins of the first set of pins may be made from carbon embedded in a resin matrix.

The pins of the second set of pins may be made from a metal.

The pins of the second set may be made from stainless steel.

The ratio of the first set of pins to the second set of pins, in terms of number of pins, may be equal to or between 0.3 and 3.

The ratio of the first set of pins to the second set of pins, in terms of number of pins may be 1.

The component may be a fan blade. The component may be a casing (e.g. a fan casing) for a gas turbine engine.

In a second aspect there is provided a gas turbine engine comprising the component according to the first aspect.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example only, with reference to the Figures, in which.

DETAILED DESCRIPTION

Figure 1:
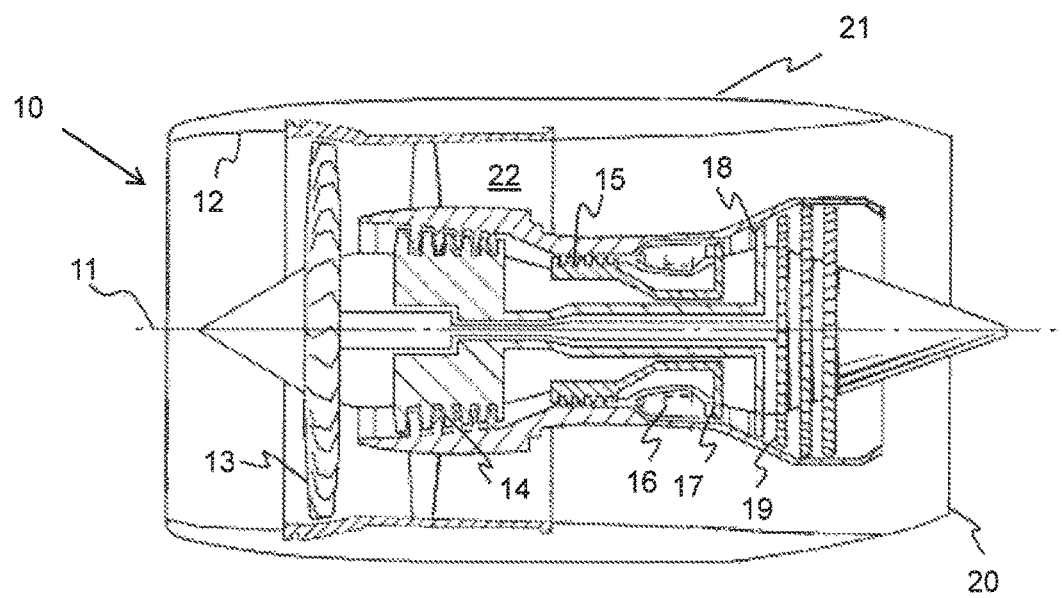
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

The intake fan 12 comprises an array of radially extending fan blades 40 that are mounted to the shaft 26. The shaft 26 may be considered a hub at the position where the fan blades 40 are mounted. The fan blades are surrounded by a fan casing 39, which may be made from a composite material.

Figure 2:
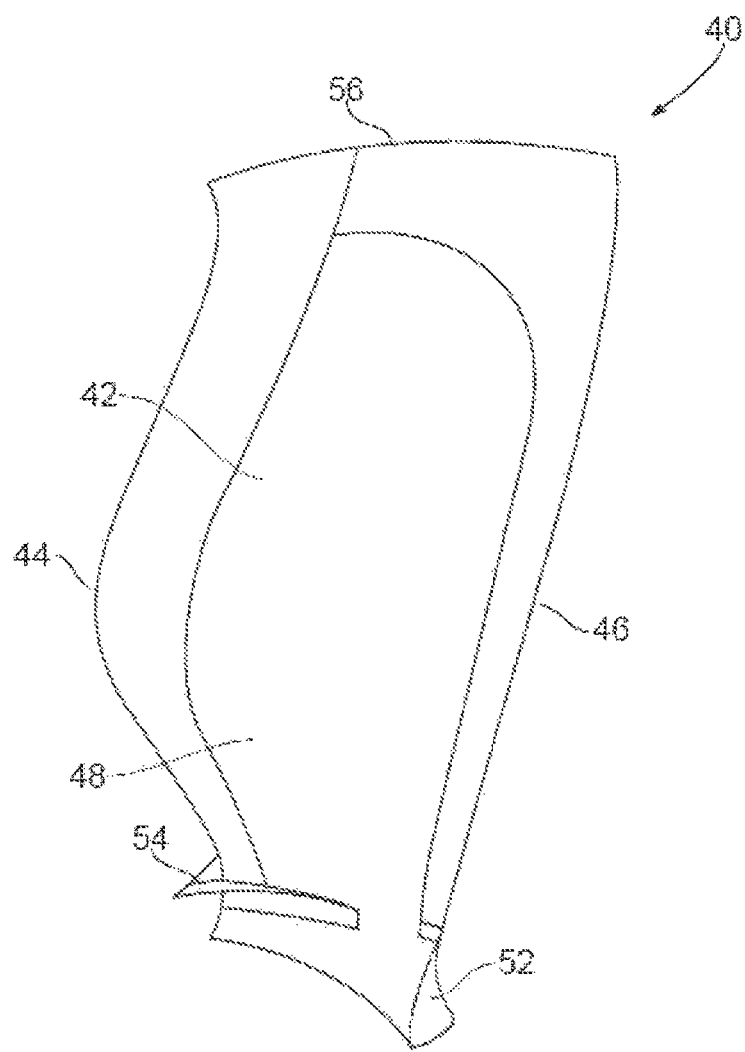
FIG. 2 is a perspective view of a fan blade.

Referring to FIG. 2, the fan blades 40 each comprise an aerofoil portion 42 having a leading edge 44, a trailing edge 46, a concave pressure surface wall 48 extending from the leading edge to the trailing edge and a convex suction surface wall extending from the leading edge to the trailing edge. The fan blade has a root 52 via which the blade can be connected to the hub. The fan blade has a tip 56 at an opposing end to the root. The fan blade may also have an integral platform 54 which may be hollow or ribbed for out of plane bending stiffness. The fan blade includes a metallic leading edge and a metallic trailing edge. The remainder of the blade (e.g. the body of the blade) is made from composite material.

Figure 3:
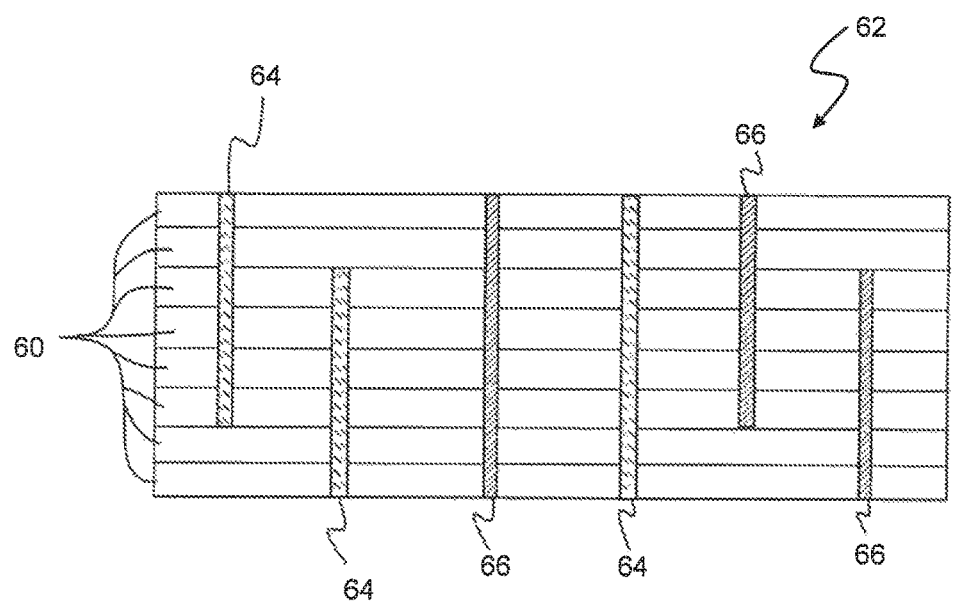
FIG. 3 is a cross sectional schematic view of a laminate that is reinforced with pins and may define part of the blade of FIG. 2.

Referring to FIG. 3, the composite material includes a laminate 60 having a plurality of plies 62 reinforced by pins 64, 66. The pins 64, 66 extend through the thickness of the laminate and are transverse to the plies. In the present example the pins are arranged substantially perpendicular to the plies, but in alternative embodiments the pins may be angled by a different angle, e.g. 45' to the plies. The pins may be arranged to extend through the full thickness of a component or through the partial thickness of a component, and/or a component may have pins extending from one surface of the component or from opposing surfaces of the component.

The pins 64, 66 may be inserted into the laminate 62 of the composite component using an ultrasonic hammer or using the method described in U.S. Pat. No. 8,893,367 which is incorporated herein by reference. In both examples, the pins are inserted before the laminate is fully cured.

A first set and a second set of pins 64, 66 are provided. Each set of pins comprises a plurality of pins of the same material, shape and diameter. The pins of the first set are made from a different material to the pins of the second set. In the present example, the pins 64 of the first set are carbon pins (i.e. carbon fibre embedded in a resin matrix) and the pins 66 of the second set are metallic pins. In the present example, the shape and diameter of the pins of the first set is the same as the shape and diameter of the second set. However, in alternative embodiments, the shape and/or diameter of the pins of the second set may be different to the pins of the first set.

In the present example there is an equal number of pins in the first set as in the second set. As will be explained later, provision of an equal number of pins in the first set and the second set has been found to be optimal. However, in alternative embodiments, there may be a greater or lesser number of pins in the first set compared to the second set, for example the ratio of the number of pins in the first set to the number of pins in the second set may be equal to or between 0.3 and 3.

Tests have found that the described arrangement of carbon and metallic pins provides improved resistance to mixed mode loading, (i.e. simultaneous loading in mode I and mode II). The following briefly describes one of the tests performed and the results from the test.

Figure 4:
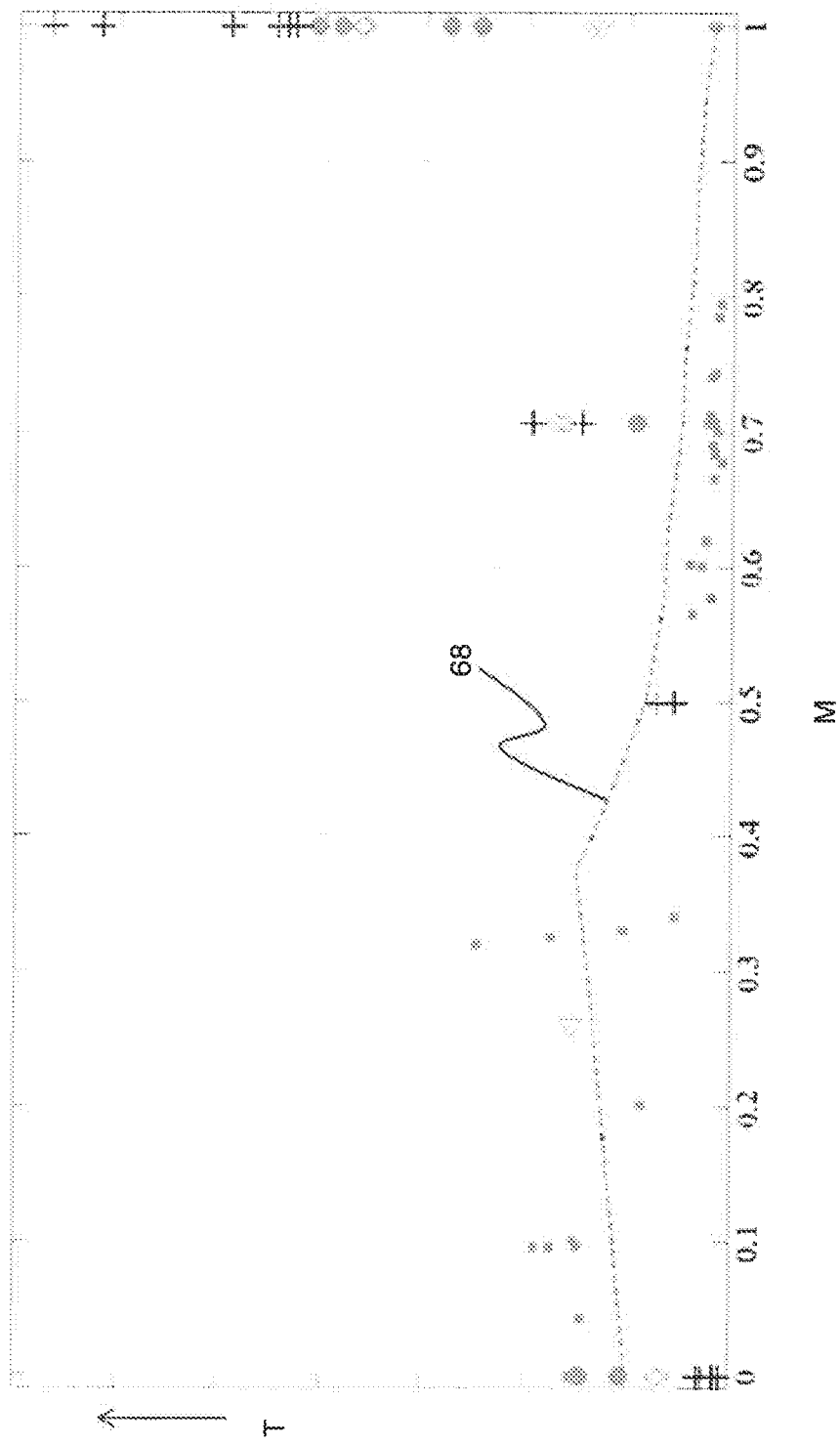
FIG. 4 is a graph of apparent fracture toughness (T) against mode mixity (M) for different pin arrangements.
Figure 5:
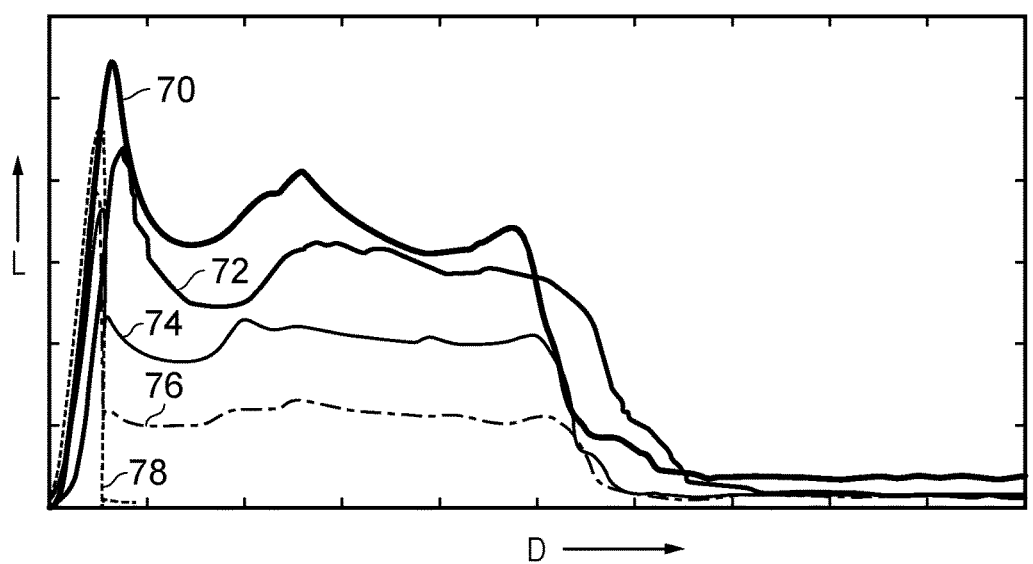
FIG. 5 is a graph of load (L) against displacement (D) of the pin for different pin arrangements in mode II loading.
Figure 6:
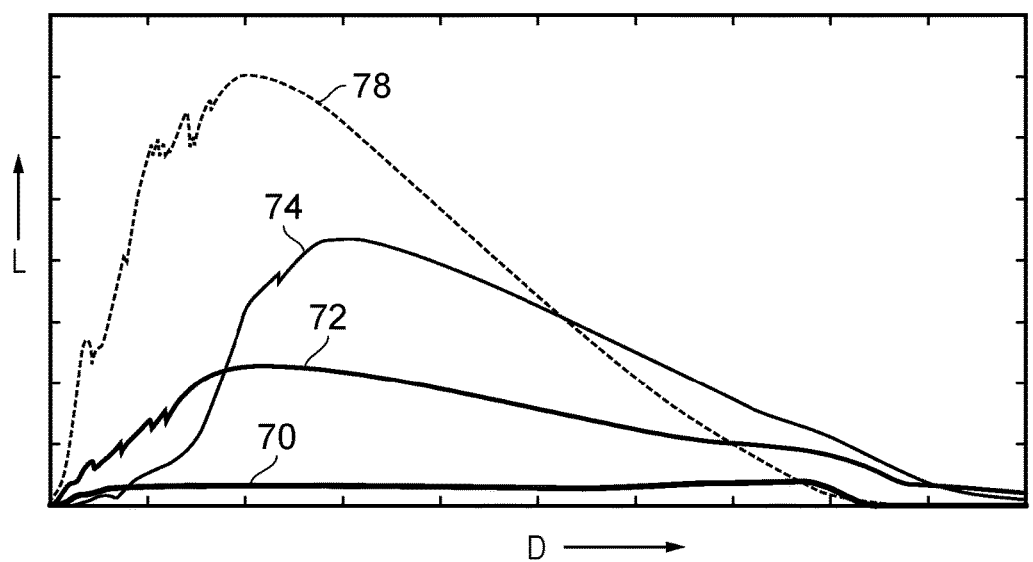
FIG. 6 is a graph of load (L) against displacement (D) of the pin for different pin arrangements in mode I loading.

Referring to FIG. 4, the apparent fracture toughness T based on 2% areal density of the a combination of pins (discussed in more below) against the mode mixity M of loading (0 represents full mode I loading, 1 represents full mode II loading, and values between 0 and 1 represent mixed mode loading with increased mode II bending towards the value of 1). The dotted line 68 indicates the nominal desirable behaviour of the pins, and as such anything below the dotted line 68 is undesirable. Referring to FIGS. 5 and 6, the displacement D of the pins under varying loads L is shown for mode I and mode II loading.

The results shown in FIGS. 4 to 6, are from tests performed on a number of quasi-isotropic specimens with a PTFE film inserted at a mid-plane to represent a crack and pinned with 16 pins. Some of the samples were pinned with 100% carbon pins (indicated with a square marker in FIG. 4), some with 75% carbon pins and 25% stainless steel pins (indicated with a triangular marker in FIG. 4), some with 50% carbon pins and 50% stainless steel pins (indicated with a circular marker in FIG. 4), some with 25% carbon pins and 75%© stainless steel pins (indicated with a diamond marker in FIG. 4) and some with 100% stainless steel pins (indicated with a cross marker in FIG. 4). In FIGS. 5 and 6, the array having 100% stainless steel pins is indicated by line 70; the array having 25% carbon pins and 75% stainless steel pins is indicated by line 72; the array having 50% carbon pins and 50% stainless steel pins is indicated by line 74; the array having 75% carbon pins and 25% stainless steel pins is indicated by line 76; and the array having 100% carbon pins is indicated by line 78.

The graph of FIG. 4 shows the carbon pins have relatively high apparent fracture toughness at mode mixities below 0.37 (i.e. more mode I than mode II failure). This is thought to be because this is where frictional pull-out of the pins is the dominant failure mode below 0.37. However, at a mode mixity greater than 0.37 high shear loading on the carbon pins can result in rupture failure of the pins, which significantly reduces the bridging effectiveness of the pins.

The graph of FIG. 4 further shows that the metallic pins have high apparent fracture toughness at higher mode mixities, i.e. where shear loading becomes dominant, but a lower apparent fracture toughness at lower mode mixities. This is thought to be due to the interfacial properties between the metal pin and the laminate.

Referring again to the graph of FIG. 4, it can be seen that when an equal number of metallic and carbon pins (i.e. the ratio of carbon pins to metallic pins is 1), the performance of the component across different mode mixities is more consistent, with the apparent fracture toughness being greater than the required minimum (indicated by dotted line 68) for all mode mixities.

Performance may further be improved by increasing friction between the metallic pins and the laminate by increasing the roughness of the surface of the pins, for example using the methods described in EP 2889131, which is incorporated herein by reference. Performance may also be optimised by selection of the material of the metallic pin, i.e. an alternative metal to stainless steel may be used.

In selection of the material for the carbon pin, the material should be selected such that it has high energy absorption in mode I loading and good interfacial properties with the laminate material. In selection of the material for the metallic pin, the material should be selected to have a high energy absorption in mode II loading and be compatible with the resin of the laminate.

The example has been described using metallic and carbon pins for examples but sets of pins made from other material may also be used. Further the described pins have a cylindrical cross section, but in alternative embodiments the pins may have any suitable cross section.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A composite component comprising:
   a plurality of plies, wherein each of the plurality of plies is comprised of reinforcing fibers in a plastic matrix; and
   a first set of pins extending in a direction transverse to the plies; and
   a second set of pins extending in a direction transverse to the plies;
   wherein the pins of the first set are made of a different material to the pins of the second set.

2. The component according to claim 1, wherein the pins of the first set of pins are made from carbon embedded in a resin matrix.

3. The component according to claim 1, wherein the pins of the second set of pins are made from a metal.

4. The component according to claim 3, wherein the pins of the second set are made from stainless steel.

5. The component according to claim 1, wherein a ratio of the first set of pins to the second set of pins, in terms of number of pins, is between 0.3 and 3.

6. The component according to claim 5, wherein the ratio of the first set of pins to the second set of pins, in terms of number of pins, is 1.

7. The component according to claim 1, wherein the component is a fan blade or a casing for a gas turbine engine.

8. A gas turbine engine comprising the component according to claim 1.

9. A composite component comprising:
   a plurality of plies; and
   a first set of pins extending in a direction transverse to the plies; and
   a second set of pins extending in a direction transverse to the plies;
   wherein the pins of the first set of pins are made from carbon embedded in a resin matrix and the pins of the second set of pins are made from a metal.

10. The component according to claim 9, wherein a ratio of the first set of pins to the second set of pins, in terms of number of pins, is between 0.3 and 3.

11. The component according to claim 10, wherein the ratio of the first set of pins to the second set of pins, in terms of number of pins, is 1.

12. The component according to claim 9, wherein the component is a fan blade or a casing for a gas turbine engine.

13. A gas turbine engine comprising the component according to claim 9.

14. A composite component comprising:
   a plurality of plies; and
   a first set of pins extending in a direction transverse to the plies; and
   a second set of pins extending in a direction transverse to the plies;
   wherein the pins of the first set of pins are made from carbon embedded in a resin matrix and the pins of the second set are made from stainless steel.

15. The component according to claim 14, wherein a ratio of the first set of pins to the second set of pins, in terms of number of pins, is between 0.3 and 3.

16. The component according to claim 15, wherein the ratio of the first set of pins to the second set of pins, in terms of number of pins, is 1.

17. The component according to claim 14, wherein the component is a fan blade or a casing for a gas turbine engine.

18. A gas turbine engine comprising the component according to claim 14.

* * * * *